United States Patent
Sender

[11] 3,750,188
[45] July 31, 1973

[54] METHOD AND APPARATUS FOR RADIO NAVIGATION

[75] Inventor: Friedhelm K. Sender, Hannover, Germany

[73] Assignee: Prakla Seismas GmbH, Hannover, Germany

[22] Filed: July 1, 1969

[21] Appl. No.: 838,174

[30] Foreign Application Priority Data
July 6, 1968 Germany.................. P 17 66 705.9

[52] U.S. Cl.............................. 343/112, 343/112 D
[51] Int. Cl................................................ G01s 5/14
[58] Field of Search................................ 343/112 D

[56] References Cited
UNITED STATES PATENTS
| | | | |
|---|---|---|---|
| 2,947,985 | 8/1960 | Cooley..................... | 343/112 D UX |
| 3,237,196 | 2/1966 | Hampton................. | 343/112 D UX |
| 3,397,400 | 8/1968 | Maass et al............. | 343/112 D UX |

Primary Examiner—Samuel Feinberg
Assistant Examiner—Richard E. Berger
Attorney—Arnold, Roylance, Kruger & Durkee, Tom Arnold, Donald C. Roylance, Walter Kruger, Bill Durkee and Frank S. Vaden, III

[57] ABSTRACT

A hyperbolic radio navigation system suitable for airborne surveys and having a pair of fixed transmitter stations and a mobile receiver station. Each station includes a frequency standard synchronized with and providing an output identical to the outputs of the other two standards. The system further includes improved transmitter circuitry for generating a preselected frequency which is the sum of coherent partial frequencies occupying the same broadcast band as the other transmitter output signal. An improved receiver is included for simultaneously detecting both transmitter signals, and for selecting one signal and suppressing the other. The receiver station further includes an improved goniometer.

41 Claims, 9 Drawing Figures

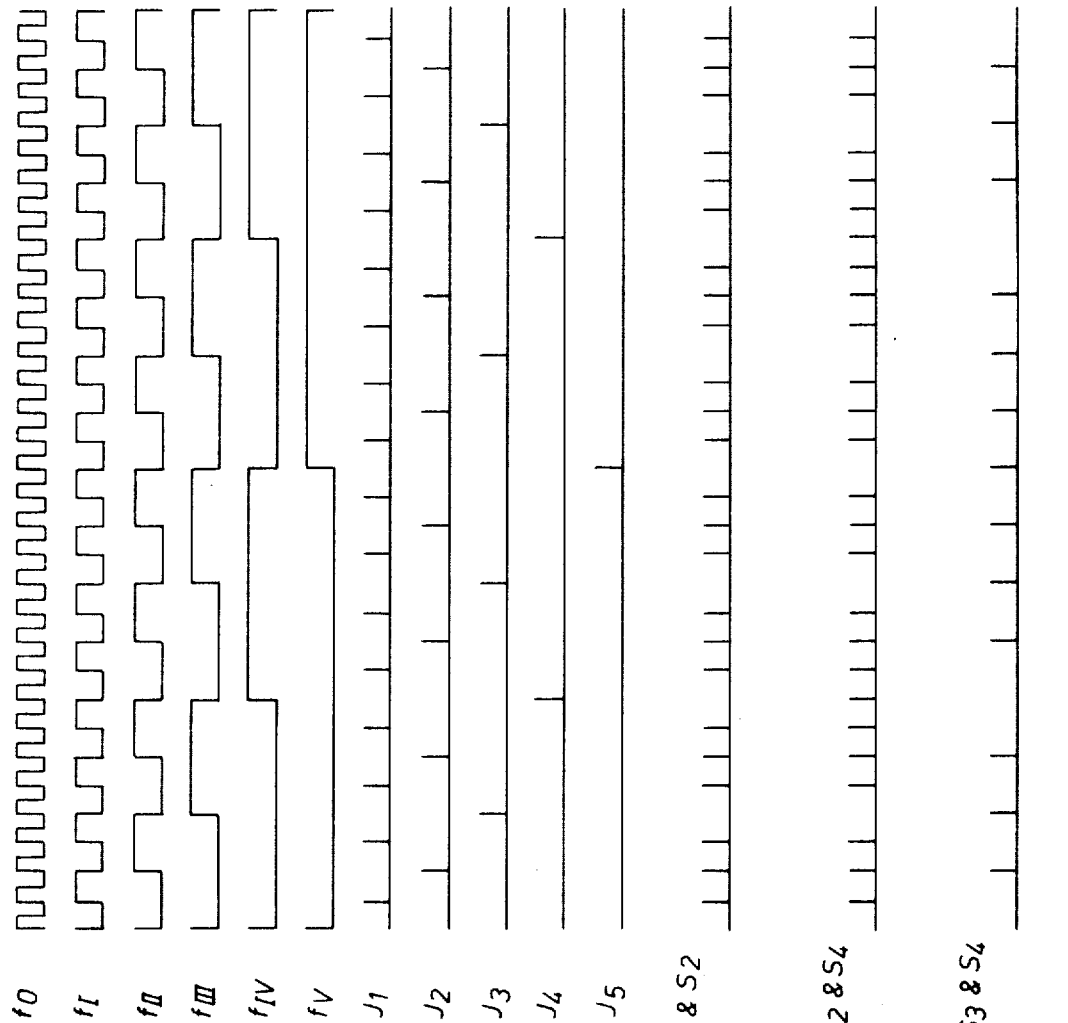

PATENTED JUL 31 1973

BY Arnold, Roylance,
Kruger & Durkee
ATTORNEYS

FIG. 8

| | QI | QII | QIII | QIV | QV | QVI | \multicolumn{5}{c}{TO DIGITAL ATTENUATOR 80} | f(φ) | \multicolumn{5}{c}{TO DIGITAL ATTENUATOR 82} | f(φ+π/2) |
|---|---|---|---|---|---|---|---|---|---|---|---|---|---|---|---|---|---|---|
| | | | | | | | 1 | 2 | 4 | 1 | 1 | | 1 | 2 | 4 | 1 | 1 | |
| 0 | 0 | 0 | 0 | 0 | 0 | 0 | 0 | 0 | 0 | 0 | 1 | 0 | 1 | 1 | 1 | 1 | 1 | +8 |
| 1 | 1 | 0 | 0 | 0 | 0 | 0 | 1 | 0 | 0 | 0 | 1 | +1 | 0 | 1 | 1 | 1 | 1 | +7 |
| 2 | 0 | 1 | 0 | 0 | 0 | 0 | 0 | 1 | 0 | 0 | 1 | +2 | 1 | 0 | 1 | 1 | 1 | +6 |
| 3 | 1 | 1 | 0 | 0 | 0 | 0 | 1 | 1 | 0 | 0 | 1 | +3 | 0 | 0 | 1 | 1 | 1 | +5 |
| 4 | 0 | 0 | 1 | 0 | 0 | 0 | 0 | 0 | 1 | 0 | 1 | +4 | 1 | 1 | 0 | 1 | 1 | +4 |
| 5 | 1 | 0 | 1 | 0 | 0 | 0 | 1 | 0 | 1 | 0 | 1 | +5 | 0 | 1 | 0 | 1 | 1 | +3 |
| 6 | 0 | 1 | 1 | 0 | 0 | 0 | 0 | 1 | 1 | 0 | 1 | +6 | 1 | 0 | 0 | 1 | 1 | +2 |
| 7 | 1 | 1 | 1 | 0 | 0 | 0 | 1 | 1 | 1 | 0 | 1 | +7 | 0 | 0 | 0 | 1 | 1 | +1 |
| 8 | 0 | 0 | 0 | 1 | 0 | 0 | 0 | 0 | 0 | 1 | 1 | +8 | 0 | 0 | 0 | 0 | 0 | 0 |
| 9 | 1 | 0 | 0 | 1 | 0 | 0 | 1 | 1 | 1 | 0 | 0 | +7 | 1 | 0 | 0 | 0 | 0 | -1 |
| 10 | 0 | 1 | 0 | 1 | 0 | 0 | 0 | 1 | 1 | 0 | 0 | +6 | 0 | 1 | 0 | 0 | 0 | -2 |
| 11 | 1 | 1 | 0 | 1 | 0 | 0 | 1 | 0 | 1 | 0 | 0 | +5 | 1 | 1 | 0 | 0 | 0 | -3 |
| 12 | 0 | 0 | 1 | 1 | 0 | 0 | 0 | 0 | 1 | 0 | 0 | +4 | 0 | 0 | 1 | 0 | 0 | -4 |
| 13 | 1 | 0 | 1 | 1 | 0 | 0 | 1 | 1 | 0 | 0 | 0 | +3 | 1 | 0 | 1 | 0 | 0 | -5 |
| 14 | 0 | 1 | 1 | 1 | 0 | 0 | 0 | 1 | 0 | 0 | 0 | +2 | 0 | 1 | 1 | 0 | 0 | -6 |
| 15 | 1 | 1 | 1 | 1 | 0 | 0 | 1 | 0 | 0 | 0 | 0 | +1 | 1 | 1 | 1 | 0 | 0 | -7 |
| 16 | 0 | 0 | 0 | 0 | 1 | 0 | 0 | 0 | 0 | 0 | 0 | 0 | 0 | 0 | 0 | 1 | 0 | -8 |
| 17 | 1 | 0 | 0 | 0 | 1 | 0 | 1 | 0 | 0 | 0 | 0 | -1 | 1 | 1 | 1 | 0 | 0 | -7 |
| 18 | 0 | 1 | 0 | 0 | 1 | 0 | 0 | 1 | 0 | 0 | 0 | -2 | 0 | 1 | 1 | 0 | 0 | -6 |
| 19 | 1 | 1 | 0 | 0 | 1 | 0 | 1 | 1 | 0 | 0 | 0 | -3 | 1 | 0 | 1 | 0 | 0 | -5 |
| 20 | 0 | 0 | 1 | 0 | 1 | 0 | 0 | 0 | 1 | 0 | 0 | -4 | 0 | 0 | 1 | 0 | 0 | -4 |
| 21 | 1 | 0 | 1 | 0 | 1 | 0 | 1 | 0 | 1 | 0 | 0 | -5 | 1 | 1 | 0 | 0 | 0 | -3 |
| 22 | 0 | 1 | 1 | 0 | 1 | 0 | 0 | 1 | 1 | 0 | 0 | -6 | 0 | 1 | 0 | 0 | 0 | -2 |
| 23 | 1 | 1 | 1 | 0 | 1 | 0 | 1 | 1 | 1 | 0 | 0 | -7 | 1 | 0 | 0 | 0 | 0 | -1 |
| 24 | 0 | 0 | 0 | 1 | 1 | 0 | 0 | 0 | 0 | 1 | 0 | -8 | 0 | 0 | 0 | 0 | 1 | 0 |
| 25 | 1 | 0 | 0 | 1 | 1 | 0 | 1 | 1 | 1 | 0 | 1 | -7 | 0 | 0 | 0 | 1 | 1 | +1 |
| 26 | 0 | 1 | 0 | 1 | 1 | 0 | 0 | 1 | 1 | 0 | 1 | -6 | 1 | 0 | 0 | 1 | 1 | +2 |
| 27 | 1 | 1 | 0 | 1 | 1 | 0 | 1 | 0 | 1 | 0 | 1 | -5 | 0 | 0 | 1 | 1 | 1 | +3 |
| 28 | 0 | 0 | 1 | 1 | 1 | 0 | 0 | 0 | 1 | 0 | 1 | -4 | 1 | 1 | 0 | 1 | 1 | +4 |
| 29 | 1 | 0 | 1 | 1 | 1 | 0 | 1 | 1 | 0 | 0 | 1 | -3 | 0 | 0 | 1 | 1 | 1 | +5 |
| 30 | 0 | 1 | 1 | 1 | 1 | 0 | 0 | 1 | 0 | 0 | 1 | -2 | 1 | 0 | 1 | 1 | 1 | +6 |
| 31 | 1 | 1 | 1 | 1 | 1 | 0 | 1 | 0 | 0 | 0 | 1 | -1 | 0 | 1 | 1 | 1 | 1 | +7 |
| 32 | 0 | 0 | 0 | 0 | 0 | 1 | 0 | 0 | 0 | 0 | 1 | 0 | 1 | 1 | 1 | 1 | 1 | +8 |

METHOD AND APPARATUS FOR RADIO NAVIGATION

BACKGROUND OF INVENTION

This invention relates to methods and apparatus for navigational purposes, and more particularly relates to improved methods and apparatus for offshore navigation.

It is well known to employ radio navigation systems for making airborne geophysical surveys over land. For example, navigation equipment employing the Doppler effect has been found particularly useful for this purpose. However, none of the techniques and equipment of the prior art has been found completely satisfactory for use offshore.

For example, if the surface of the water is completely calm, the Doppler equipment will not receive a signal because the inclined transmission beam will not be reflected in its direction of incidence. On the other hand, the transmission beam will be reflected at a relatively steep angle if the surface of the water is only moderately agitated. Since the aperture of the detection antenna cannot be maintained arbitrarily small or narrow, the basic velocity measurement will be reduced by an unknown and unpredictable amount.

Another disadvantage exists in the fact that the Doppler equipment inherently measures the propagation of the waves. In other words, the reflected signal moves toward the receiver at a velocity which is a function of the velocity of the waves of water, and this can produce considerable error in the measurement.

A further disadvantage arises from the fact that it is necessary to employ photo navigational measurements to determine points of intersection with sufficient precision, and to provide the time correction necessary because of integrated Doppler errors which are unavoidable. Although this is relatively simple in the case of surveys over land, photo navigational measurements cannot be made over water.

Modern inertial navigation techniques have similarly been found unsatisfactory for offshore purposes. Not only is equipment of this type far too expensive, it is not sufficiently accurate and reliable. Astronomical and satellite navigation cannot yet be used for this purpose, and only in rare instances can a fixed net of LORAN C or DECCA installations be found. Furthermore, LORAN C receivers are extremely costly to repair as well as to purchase, and it is only in exceptional instances that the expense of a DECCA receiver and plotter chain can be justified.

Several mobile systems of medium range are commercially available. For example, the so-called DECCA "Hi-Fix" system is a hyperbolic system which has been found useful in some instances, and if the main transmitter is installed at the vehicle this will convert the equipment to a two range system. Unfortunately, however, the DECCA Hi-Fix system is a multiplex system having a flywheel servosystem, and cannot be operated reliably at travel velocities greater than about 25 km (20 knots). Thus, a system of this type can only be used on shipboard and is completely impractical for airborne use.

The well known LORAC and TORAN systems are useful in theory, but require four ground stations. Moreover, the so-called "reference" station is quite bulky, and is difficult to install. Moreover, this equipment operates on a 1.8 MHz frequency, and it is extremely difficult to obtain authorization to operate such equipment, since at least two carrier frequencies are required.

The well known RAYDIST system is a hyperbolic system requiring only three ground stations. However, two harmonic band frequencies are required for this equipment, and it is extremely difficult to obtain free channels in this frequency range.

It is expensive to install and operate a ground station. Thus, the so-called RHO-THETA system has been adopted for some purposes, since this system operates with only one ground station providing distance and azimuth indications to the transmitter station. This type of system (known in aeronautics as the "VOR/DME", and in military organizations as "TACAN") has the disadvantage, however, of requiring the use of a relatively elaborate ground station which is difficult to install. Furthermore, such a system does not have the accuracy (especially as to goniometrical measurements) required for geophysical surveys.

The early SHORAN type of system is not now in general use, because of the waste of time caused by the manually-operated receiver equipment, and because of the difficulty encountered in obtaining governmental approval. The automatic systems such as RAYDIST, HIRAN, and AUTOTAPE, which are in greatest use, are relatively accurate. However, these systems have only a limited range, even when the airborne transmitter is equipped with a directional antenna. Furthermore, it is rather difficult to use a directional antenna with an airborne transmitter, since the strength of its field interferes with the operation of the geophysical equipment aboard the aircraft. Moreover, such an antenna makes it impossible for several recording stations to use the same ground station at the same time.

These disadvantages of the prior art are overcome with the present invention, and novel methods and apparatus are provided which are particularly suitable for performing aerial navigation and geophysical surveying.

SUMMARY OF INVENTION

In an exemplary form of the present invention, a radio navigation system is provided wherein a receiver station is located in a mobile vehicle (such as an aircraft), and wherein the receiver is adapted to detect output signals provided by at least two transmitter stations having preselected characteristics and controlled by frequency standards operating in synchronism. The receiver station also contains a frequency standard operating in synchronism with the frequency standards in the transmitter stations, whereby the travel times of the received transmitter signals may be determined.

The system and method of the present invention provides the feature of self-bearing navigation for making geophysical surveys from one navigation point, and especially from a single plane without a radio transmitter. Accordingly, the present invention is characterized by the fact that preselected frequencies which are the sum of coherent partial frequencies, differing only slightly from each other, are derived from a common base frequency supplied by the frequency standard, and transmitted by the transmitter station. Further, these preselected frequencies are received in the receiving station each in a separate single channel, in order that the other preselected frequency is suppressed. Moreover, the preselected frequency thereby received and selected may be compared with the output of the frequency standard in the receiver station, in order to furnish an indication of distance. In this aspect of the present invention, it is desirable that both preselected frequencies fall within a single frequency band.

It is also a feature of the present invention to provide a transmitter which includes frequency synthesizing means for deriving a selectable carrier frequency from the standard frequency associated with the transmitter station. The transmitter further includes a power stage, antenna, and a power supply. It is a further feature of the present invention to provide an airborne navigation system which usually requires only two ground stations, and wherein the transmitters are relatively simple to construct and install.

The receiver station preferably includes a receiving antenna, an rf amplifier stage, anatomic frequency standard as hereinbefore stated, a frequency synthesizer, and a phase comparison stage. The system preferably operates with a well marked ground wave range, since the optimum operating range of the system is approximately 300 kilometers, and the surveying aircraft usually flies at relatively low altitudes. Accordingly, UHF and VHF frequencies are not ordinarily used because of quasi-optical propagation, and reflections from the surface of the earth and from structures located thereon. Accordingly, longer wave lengths are preferred with the present invention, not only because of the difficulty usually encountered in obtaining governmental authorization to employ UHF and VHF broadcast bands, but also because these bands require extremely bulky antennas to obtain effective transmission and reception. In addition, the VHF range is particularly undesirable because of the occurrence of undesired indirect radio waves. Accordingly, it has been determined that the most practical frequency is the 1.8 MHz navigation band.

It is another feature of the present invention to transmit an unmodulated carrier frequency which is extremely constant, in order that only very low bandwidths are required for the receiver station. Thus, the receiver is provided with a very high sensitivity to the signal sought to be received, and concurrently a very low sensitivity to noise and other disturbances. A double crystal filter is preferably used to obtain such a narrow band width, whereby bandpass curves of ± 25 cps width may be obtained. In addition to the bandpass peak corresponding to the series resonance, these crystal filters provide a high "attenuation hole" which is caused by parallel resonance. Accordingly, it is another feature of the present invention that the two essential transmitter frequencies are arranged in a manner such that each frequency will fall into the "hole" in the adjacent channel filter, as well as into the bandpass peak of the receiving filter associated with it.

For these reasons, the carrier frequencies may be close enough that, they will occupy the same licensed broadcast channel. Suitable spacings in the filters between hole and peak having been found at 1.5 KHz, so that a channel with a ± 750 Hz bandwidth, or a licensed frequency tolerance of $2.5 \times 10^{-4}$, is sufficient for both carriers. Also, propagation conditions and velocities will be substantially equal for both frequencies.

It is another feature of the present invention to obtain attenuation of the adjacent channel greater than 80 dB. The first crystal filter is located ahead of the first amplifier stage, so that the adjacent channel can still be received without interference even when the receiver is directly overhead of a transmitter station.

Another feature of the present invention is an improved hybrid digital goniometer, which operates electronically, but which provides the stability of conventional mechanical goniometers. The goniometer of the present invention delivers a direct digital output, has a much longer useful life, and is less bulky and absolutely maintenance free.

These and other features and advantages of the present invention will be apparent from the following detailed description, wherein reference is made to the figures in the accompanying drawings.

DRAWINGS

FIG. 3 is a pulse schedule illustrating the operation of the circuitry depicted in FIG. 2.

FIG. 8 is a schedule showing the counting sequence of the apparatus depicted in FIG. 6.

DETAILED DESCRIPTION

Figure 1:
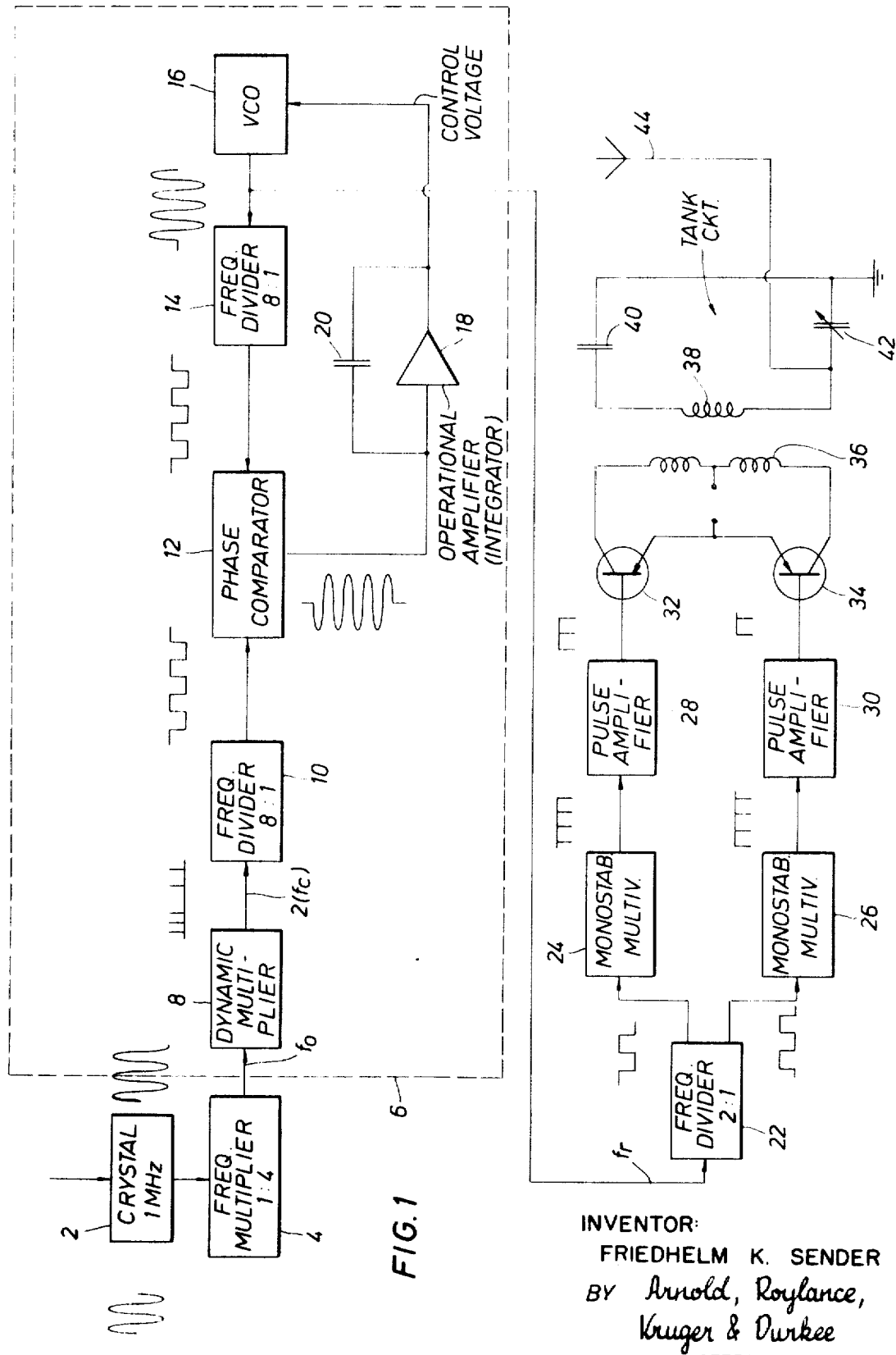
FIG. 1 is a functional representation of one embodiment of a transmitter suitable for the purposes of the present invention.

Referring now to FIG. 1, there may be seen a functional representation of one embodiment of apparatus suitable for the purposes of the present invention, and including a frequency standard 2 adapted and arranged to generate a preselected frequency such as 1 MHz which may be applied to a suitable frequency multiplier 4 for multiplication by a suitable factor.

The output of the frequency multiplier 4 is applied to the input stage of a frequency synthesizer 6, and in particular to a suitable dynamic multiplier 8 which provides an output which is the equivalent of a preselected multiple of the carrier frequency in pulses per second. To reduce the phase modulation index, this output signal from the dynamic multiplier 8 is divided by a suitable frequency divider 10, which may be a three-stage flip-flop circuit.

As will be apparent, it is desirable to maintain tight control of the transmitter output signal, and thus the output from the divider 10 is preferably applied to one input of a phase comparator 12 having its output connected to the input of an operational amplifier circuit composed of an amplifier 18 having a suitable capacitor 20 connected across its input and output terminals. The output of the operational amplifier may be connected to the input of a suitable voltage controlled oscillator 16 having its output signal connected to the input of another frequency divider 14 preferably adapted to divide by the same factor as the other frequency divider 10.

The voltage controlled oscillator 16 may be a crystal oscillator which operates at the double carrier frequency. The phase comparator 22 preferably operates with digital logic circuits and a dynamic digital/analog converter, which yields a dc output signal in response to phase difference. As indicated, this DC output constitutes the control voltage for the oscillator 16 to hold the output of the oscillator 16 exactly in accordance with the mean output frequency of the dynamic multiplier 8. Thus, an alarm circuit (not depicted) is preferably included for actuation in case the locking control loop fails.

As further indicated in FIG. 1, the output from the voltage controlled oscillator 16 is also the output signal of the frequency synthesizer 6, and may be applied to another frequency divider 22 for providing a symmetrical rectangular carrier signal. Accordingly, the frequency divider 22 is preferably a flip-flop circuit providing a true output to a first monostable multivibrator 24, and an inverted output to a second monostable multivibrator 26. The outputs of the two monostable multivibrators 24 and 26, which are 180° out of phase, are applied to the inputs of two pulse amplifiers 28 and 30, respectively, which have their outputs connected to a power amplifier composed of two PNP transistors 32 and 34 connected in push-pull relationship with one winding 36 of a suitable transformer. The opposite winding 38 may be seen to be interconnected with a pair of suitable capacitors 40 and 42 to form a tank circuit having its output connected to a suitable antenna 44. As indicated, the capacitor 42 is preferably variable whereby the tank circuit may be tuned.

The output pulses from the two monostable multivibrators 24 and 26 are generated at extremely short intervals, for example, 100 nanoseconds duration. Because of the relatively high storage effect of the transistors 32 and 34, the pulses applied to their base electrodes must be extremely short in duration, and preferably shorter than 120 nanoseconds. The conduction angle of the collector current in each of these transistors 32 and 34 will then have an optimum value.

The antenna circuit 38, 40, 42, 44 may be considered a modified Pi-version or type of apparatus, inductively coupled to the push-pull power stage by means of a coil 36, as previously indicated. To avoid antenna feeding problems, the transmitter circuit may be connected directly to the base (not depicted) of the antenna and matched to its impedance.

As is well known, atomic clocks or frequency standards normally deliver only fixed frequencies of 0.1–1.0 and 5 MHz. Thus, the carrier and oscillator frequencies, which must be derived, must be compatible with one of these frequencies. There are several frequency synthesizing techniques presently employed in conventional rf equipment, but the equipment of the prior art is extremely bulky since they all require many resonance and filter circuits. The synthesizer provided in the instant invention, however, is composed of digital and logic circuitry whereby the requirements of the instant invention are met with compact and simple apparatus.

Figure 2:
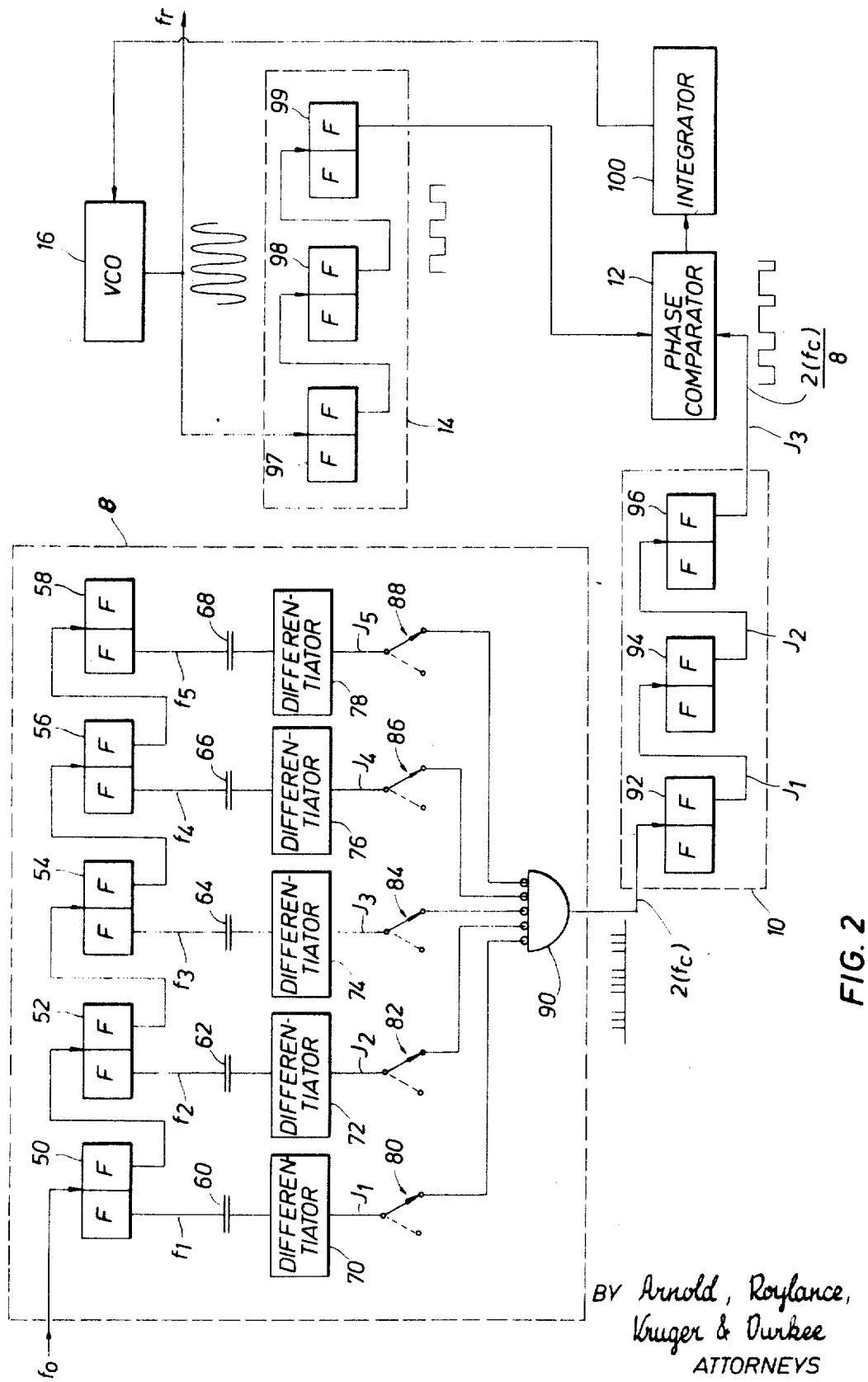
FIG. 2 is a functional representation of a portion of the apparatus depicted in FIG. 1, including one embodiment of a frequency synthesizer circuit suitable for the purposes of the present invention.

Referring now to FIG. 2, there may be seen a more detailed functional representation of an exemplary embodiment of the frequency synthesizer illustrated in FIG. 1, and showing how the dynamic multiplier 8 may be composed of a chain of five flip flop circuits 50–58 interconnected with an OR gate 90. In particular, the output frequency $f_o$ from the 4:1 frequency multiplier 4 may be seen to be connected to the input side of the leading flip flop circuit 50. Each of the flip flops 50–58 may be coupled to the OR gate 90 by means of respective ones of five differentiators 60–68 and 70–78, and five programming switches 80–88. The output signal, $2(fc)$, generated by the OR gate 90, is applied to the input of the 8:1 frequency divider 10, which may be a chain of three flip flops 92–96.

As may be seen, the aforementioned dynamic multiplier 8 has two inputs. The first input is the signal generated by the frequency standard 2 and 4:1 frequency multiplier 4. The other input is a fixed binary number at the input side of the OR gate 90, which is either zero or one, and which is determined by the position of the switches 80–88. The output of the dynamic multiplier 8 is a train of unequally spaced pulses having an average frequency corresponding to the product of the input frequency $f_o$ multiplied by the "wired" binary number, or $2(fc)$ as hereinbefore stated.

The dynamic multiplier 8 may be seen to be a "ripple" counter, wherein each stage (flip flop) toggles upon receipt of a negative input pulse. The inverted output pulses from each of the five flip flops 50–58 are differentiated as hereinbefore stated, and are then fed to the OR gate 90 through respective ones of the five switches 80–88. Thus, switch 80 controls the signal $f_o/2$ pulses provided by the first flip flop 50, switch 82 controls the signal $f_o/4$ provided by the second flip flop 52, switch 84 controls the signal $f_o/8$, etc.

It should be noted that none of the pulses in any one of these pulse trains applied to the OR gate 90 ever coincides with a pulse in any of the other pulse trains. Thus, the dynamic multiplier 8 has the advantage of allowing two or more pulse trains to be gated together to obtain an output frequency or synthesized frequency which is simply the algebraic sum of the frequencies at the inputs of the flip flops 50–58, and this would be impossible if coincidence occurred. Each carrier-frequency derived from the synthesizer presented in FIG. 2 is composed with the algebraic sum of subdivided "partial" frequencies of a binary divider-chain. Since all these divided frequencies are coherent to the atomic-input frequency, the finally generated carrier-frequencies are also coherent to the standard-frequency, though they may differ only by a small amount of several Hertz mutual. The smallest possible frequency-step depends on the length of the binary divider, i.e., the frequency of the last flip-flop in the chain.

The purpose and function of the dynamic multiplier 8 is to generate an output frequency which is equal to the product of its input frequency $f_o$ and "X", wherein X is the sum of the frequencies X1, X2, etc. as established by the closed ones of switches 80–88. As hereinbefore suggested, X1 will be $f_o/2$, X2 will be $f_o/4$ etc., and X5 will be $f_o/32$.

Referring now to FIG. 3, there may be seen a pulse schedule showing the occurrence and relationship of the various signals provided throughout the dynamic multiplier 8 in response to its input signal $f_o$. In particular $f_1 - f_5$ are the pulse trains generated by the five flip flops 50–58, respectively, $J_1 - J_5$ are the pulse trains generated by the five differentiator circuits 70–78, and three examples of output signals provided by the OR gate 90 are given.

It will be noted that the pulse-to-pulse spacing is generally not uniform in the output signals from the OR gate 90. Accordingly, it is more particularly the average frequency of the output of the OR gate 90 which is sought to be established. If a greater resolution is desired, this may be accomplished by providing additional flip flop stages in the dynamic multiplier 8.

As further illustrated in FIG. 2, the output signal from the OR gate 90 may be applied to the input side of a suitable 8:1 frequency divider 10, which may conveniently be a chain of three flip flop circuits 92-96. The other 8:1 frequency divider 14, which receives the output of the voltage controlled oscillator 16, may similarly be a chain of three flip flop circuits 97-99, and the outputs of these two frequency dividers 10 and 14 may be coupled to the inputs of a phase comparator 12 as hereinbefore stated.

In other words, the voltage controlled oscillator 16 is locked to the average pulse output of the dynamic multiplier 8, rather than to a pure frequency per se. Thus, the averaging phase modulation index, of the output of the dynamic multiplier 8, is reduced by means of the frequency divider 10, and since the frequencies must be equal in order to be utilized by the phase comparator 12, the output of the voltage controlled oscillator 16 is similarly divided.

The DC signal representing the error determined by the phase comparator 12 will nevertheless contain an AC component of substantial size corresponding to the phase modulation of the pulse train generated by the phase comparator 12. This is filtered out by means of the integrator circuit 100, which is depicted in FIG. 1 as the operational amplifier 18, before being returned to the voltage controlled oscillator 16 for controlling the frequency of its output.

Figure 4:
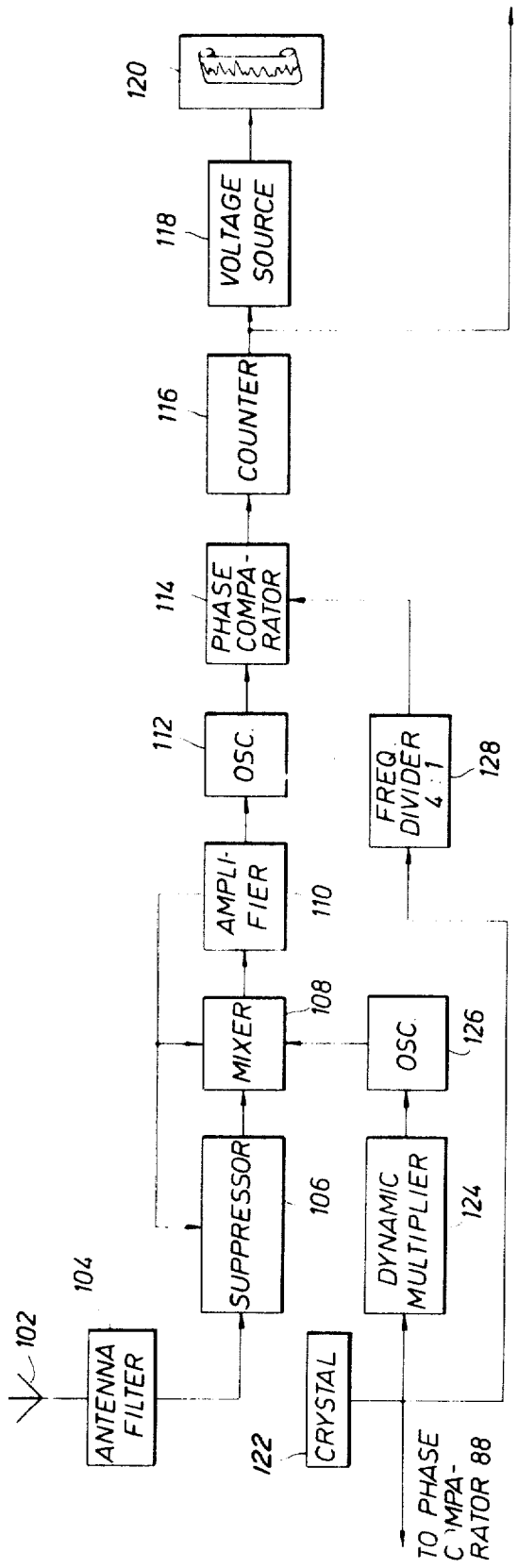
FIG. 4 is a functional diagram of one embodiment of a receiver suitable for the purposes of the present invention.

Referring now to FIG. 4, there may be seen an exemplary embodiment of a receiver circuit suitable for purposes of the present invention, and having an antenna 102 for receiving the frequency provided by the antenna 44 mounted on the transmitter depicted in FIG. 1. The signals detected by the receiving antenna 102 may be passed through a suitable antenna adaptor or filter 104 and applied to both of two equal channels. Inasmuch as both channels are equal except for the tuned carrier frequency, only one channel is depicted in FIG. 4.

Accordingly, the input stage of this channel may include a suppressor circuit 106 including a bridge crystal filter (not depicted) having a suppression maximum in the frequency range of the adjacent channel. The output of the suppressor circuit 106 is applied to one of the input stages of a suitable mixer circuit 108 having its other two inputs connected to the output of a controlled quartz oscillator 126, or the like, and to feedback of its own output signal from a suitable amplifier 110.

A suitable frequency standard 122 may be included for generating an output to a dynamic multiplier 124 which generates a frequency $fc$ to the oscillator 126 which is lower by $f_o/4$ than the frequency provided by the suppressor circuit 106. The intermediate frequency for the phase comparator is generated by a 4:1 frequency divider 128 to one of the inputs of a phase comparator 114, the other input of which is connected to receive the output of a quartz oscillator 112 which is locked to the I.F.-amplifier 110 to achieve a minimum signal-to-noise ratio. The output of the phase comparator 114 may then be applied to conventional counting, storing and display equipment, such as a counter 116, a suitable voltage supply 118, and a chart or tape recorder or oscilloscope 120, or the like.

It is desirable to obtain the output of the phase comparator 114 in direct digital form. A number of techniques for achieving this result are known to the prior art. However, none of these prior art techniques have been found satisfactory, since they do not meet the noise suppression requirements of the system depicted and described herein, or because of their excessive weight, power requirements, complexity and relatively short useful life, or because of the necessity to utilize a digital angle encoder.

Figure 9:
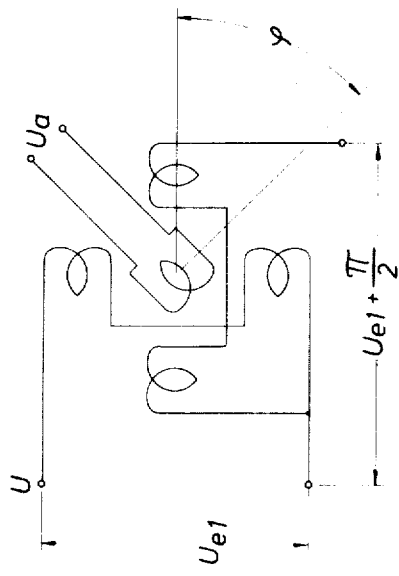
FIG. 9 is a functional representation of one embodiment of an electronic-to-mechanical resolver suitable in the present invention for finding and indicating direction.

Referring now to FIG. 9, there may be seen a functional representation of an electronic resolver suitable for comparing with a goniometer using a complete solid state technique in digital analog hybrid technique with digital output. The essential feature of this electronic apparatus is that it functions analogue to an electromechanic resolver having its output voltage switched as a phase shifter, and with input voltages $U_{e1}$ and $U_{e2}$, wherein $U_{e1}$ is equal to A $\sin\omega t$ and $U_{e2}$ is equal to A $\sin\omega t$ plus $\pi/2$. Accordingly, $U_a$ is equal to $U_{e1} \sin\rho + U_{e2} \cos\rho$.

If a suitable digital-to-analog converter could be found which would produce voltages equal to $\sin \rho$ of $U_{e1}$, and $\cos \rho$ of $V_{e2}$, and which could provide the sum of these voltages, such a converter would constitute an electronic solution to the problem. The problem can be simplified, however, by utilizing triangular input voltages, instead of voltages which are sine shaped, since these voltages are used in the integration of a square or rectangular input voltage. Thus, $U_{e1}$ and $U_{e2}$ may be alternating triangular functions which are shifted by the factor $\pi/2$. Further, it will be apparent that the function $U_a$ is an alternating function equal to $f(\rho)U_{e1} + U_{e2}$. Only in the cases wherein $\rho$ equals zero, $\pi/2$, $\pi$, or $3\pi/2$, will the summed output voltage be a linear alternating triangular function. In all other cases, the output voltage will form an odd alternating function.

Whenever zero is passed, however, the summed output voltage will be linear with $\rho$. A rectangular voltage may again be produced by means of a Schmitt trigger circuit or a differential comparator with each passing of zero, and a linear digital phase shifter for rectangular input and output voltages may be obtained with digital techniques and apparatus. Differential comparators, which may also be referred to as voltage comparators or simply, comparators, normally have two inputs to be connected for comparison and may be of the type manufactured by Fairchild Camera and Instrument Corporation of 464 Ellis St., Mountain View, Calif. 94040. For example, the circuit typically employed in a preferred embodiment of the present invention is referred to as a $\mu$ A710 which is an IC manufactured by Fairchild. A differential comparator is employed to detect whether the input-voltage is positive or negative in respect to ground potential. The second input therefore is considered grounded as is frequently the case with operational amplifiers.

Figure 5:
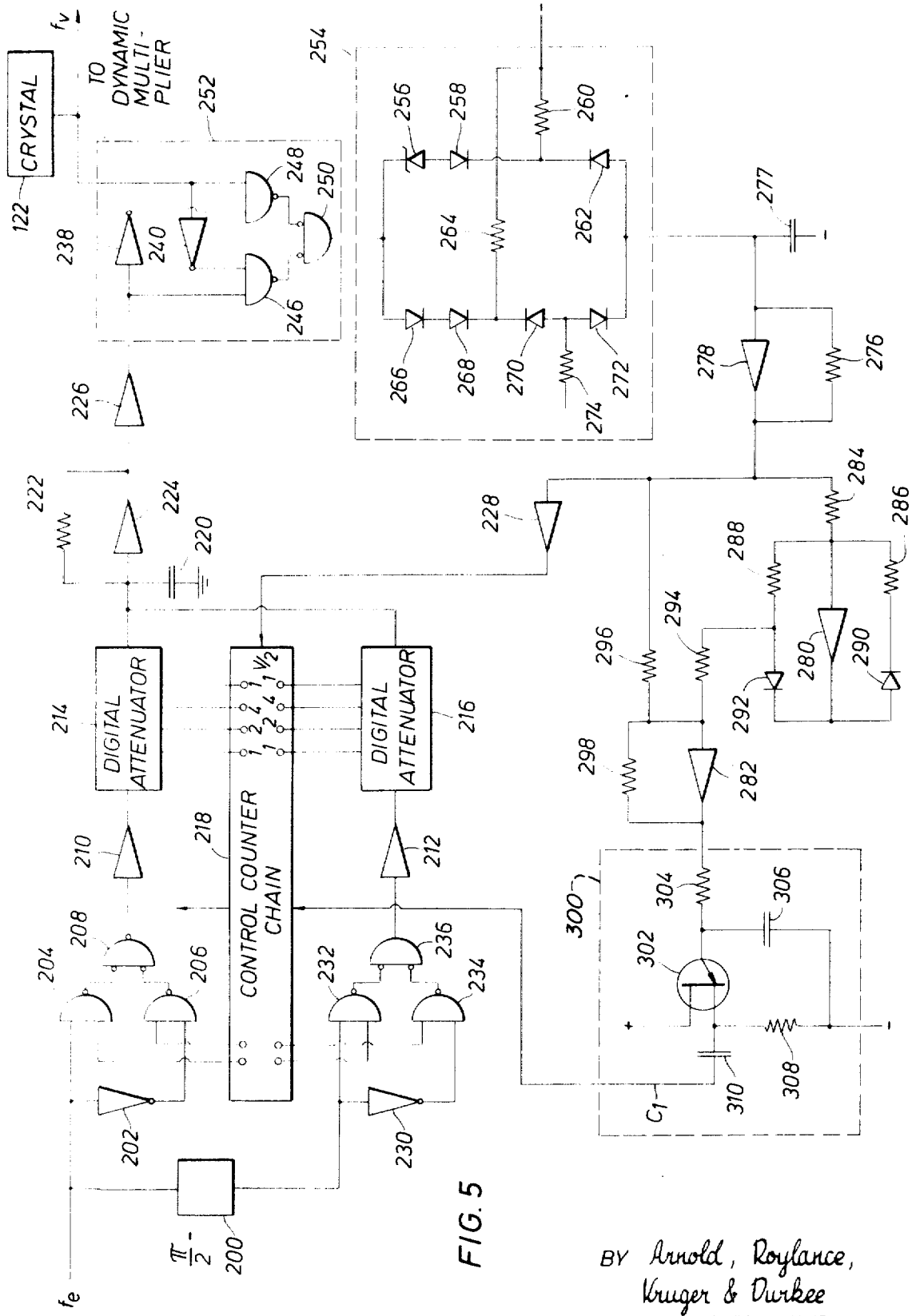
FIG. 5 is a functional diagram of a portion of the apparatus depicted in FIG. 4, including the goniometer.

Referring now to FIG. 5, there may be seen a functional representation of a digital goniometer having the function of a mechanical resolver and being suitable for replacement of the apparatus depicted in FIG. 9. In particular, the input signal $f_e$ may be seen to be controlled by a suitable control counter chain 218 by way of digital attenuators 214 and 216. The control counter chain 218 is fed by an output signal of the phase-comparator and causes the input signal $f_e$ to be merely controlled by the phase comparator. The input signal $f_e$ does not pass through the control counter chain but rather is controlled by the control counter chain. More particularly, the signal $f_e$ is applied directly to an inverter 202 and to one input of the AND gate 204, after being passed through a suitable phase delay circuit 200, to another inverter 230 and to one input of another opposite AND gate 232. The outputs of inverters 202 and 230 are connected, respectively, to one of the inputs of AND gates 206 and 234. The other inputs of AND gates 204, 206, 232 and 234 may be seen to be connected to appropriate portions of a control counter chain 218 which is depicted in greater detail in FIG. 6.

Figure 7:
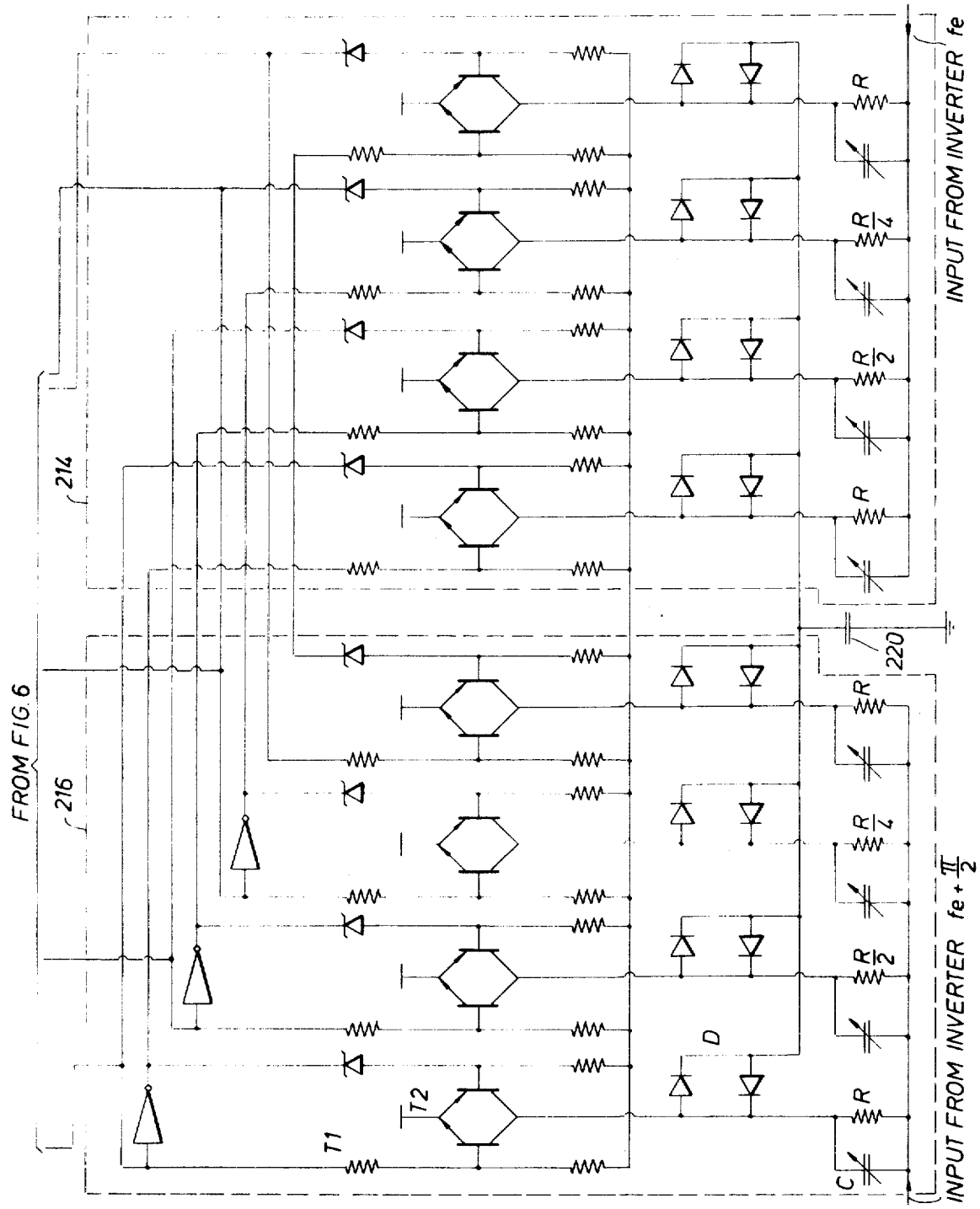
FIG. 7 is a functional diagram of another portion of the goniometer depicted in FIG. 5.

The outputs of AND gates 204 and 206 are connected through a suitable OR gate 208 to the input of a suitable voltage limiting amplifier 210 having its output coupled to a digital attenuator 214. The outputs of AND gates 232 and 234 are connected through a different OR gate 236 to the input of another voltage limiting amplifier 212 having its output connected to another digital attenuator 216. FIG. 7 illustrates the details of circuitry suitable for two digital attenuators 214 and 216.

The outputs of both attenuators 214 and 216 may be seen to be connected to the input of an integrating circuit composed of capacitor 220, amplifier 224 with a resistor 222 connected to provide an operational amplifier circuit having its output connected to a differential comparator 226. The output of the differential comparator 226 may be seen to be connected to one input of a phase comparator 252, having its other input connected to the frequency standard 122, and composed of oppositely arranged inverters 238 and 240 coupled to AND gates 246 and 248. The output stage of the phase comparator 252 may be seen to be an OR gate 250 having its inputs coupled to the outputs of the two AND gates 246 and 248, and having its output connected to the input of a dynamic analog converter 254.

As may be further seen in FIG. 5, the converter 254 includes a pair of diodes 266 and 268 arranged in series to receive and conduct input signals to resistor 264, and to a blocking diode 270. The input signals are also received by a Zener diode 256 interconnected with opposing diodes 258 and 262. The circuit further includes a load resistor 260 connected between the junction of diodes 258 and 262, and the negative supply voltage. Positive voltage is applied to one end of a resistor 274 having its other end connected to the junction of opposing diodes 270 and 272, and negative voltage is applied to the junction between resistors 260 and 264.

The output of the dynamic analog converter 254 may be seen to be connected to another integrating circuit composed of a grounded capacitor 277, and an amplifier 278 coupled in parallel with a resistor 276 to form an operational amplifier. The capacitor 277, although shown to be connected to the negative supply, is considered grounded in respect to AC signals. Normally the negative supply voltage will be a convenient AC ground and in many cases may also serve as a DC ground. The output of this integrating circuit is applied through another differential comparator amplifier 228 to the control counter chain 218, and to a pulse generator 300 by way of a precision full wave rectifier/amplifier circuit.

More particularly, the first rectifier/amplifier circuit may be seen to include an amplifier 280 having its input side connected through a resistor 284 to the output of the operational amplifier 278, and having its output coupled to the junction of two series-connected diodes 290 and 292. A resistor 288 is connected between the diode 292 and the input of the amplifier 280, and another resistor 286 may similarly be connected between the diode 290 and the junction between the two resistors 284 and 288.

The second rectifier/amplifer circuit includes another amplifier 282 connected in parallel with a suitable resistor 298 to form an operational amplifier, and having its input further connected to the junction between resistors 294 and 296. The first resistor 294 is coupled to the junction between the diode 292 and the resistor 288, and the other resistor 296 is coupled between the input of the amplifier 282 and the output of the amplifier 278.

The pulse generator 300, which is coupled between the control counter chain 218 and operational amplifier 282, may be seen to include a double base transistor 302 having its emitter connected through a resistor 304 to the output of the operational amplifier 282, and having one base electrode coupled to positive voltage. The other base electrode of the transistor 302 is coupled through a capacitor 310 to the control counter chain 218, and also through a resistor 308 and capacitor 306 to the emitter. The junction of the resistor 308 and the capacitor 306 is coupled to negative voltage.

Referring again to FIG. 5, it will be apparent that the digital goniometer will have both the true (positive) and the inverted input frequency information which, in the case of AC voltages will correspond to a polarity reversal equal to $\pi$(Pi). Accordingly, the inverters 202 and 230 are provided to achieve this effect, whereby the input frequency $f_e$ is transmitted directly through the inverter 202 and the voltage limiting amplifier 210 to the digital attenuator 214. On the other hand, the input frequency $f_e$ is shifted $\pi/2$ by the delay network 200 before being passed through the other inverter 230 and voltage limiting amplifier 212 to the control counter chain 218, in order to simulate the second phase.

The output voltages of both attenuators 214 and 216 are integrated to an alternating triangular function by means of the integrating circuit composed of the grounded capacitor 220, and the operational amplifier 224 which amplifies the sum of these voltages. The result is then converted to a rectangular voltage by the differential comparator 226 to obtain clear zero passings, and is then compared in the phase comparator 252 with the rectangular frequency $f_v$ provided by the frequency standard 122 depicted in FIG. 4. Thus, the output of the phase comparator 252 is a rectangular voltage with a phase difference dependent on DC in the dynamic analog converter 254, with zero voltage corresponding to a 90° phase shift. This voltage is again magnified by the amplifier 278, and is then supplied to the control counter chain 218 as bi-direction control information by way of the second differential comparator 228, which determines whether there is a positive or negative deviation.

The output of the second rectifier/amplifier 282 is positive irrespective of the polarity of the output voltage of the phase comparator 252. This positive signal produces pulses having a voltage, (i.e. phase error) dependent frequency by means of the double base transistor 302, and these pulses trigger the control counter chain 218 as long as the output frequency of the phase comparator 252 is zero. Accordingly, the phase ratio of the input signal $f_r$ to the output signal $f_v$ is constantly maintained at 90°, and the number of control pulses will be dependent on the number of stages in the control counter 218 (see FIG. 6) during a complete 360° cycle.

In the apparatus depicted herein, 32 pulses preferably constitutes a cycle. Although considerably higher resolutions can be obtained, a step width of about 5 m/pulse is usually fully sufficient.

Figure 6:
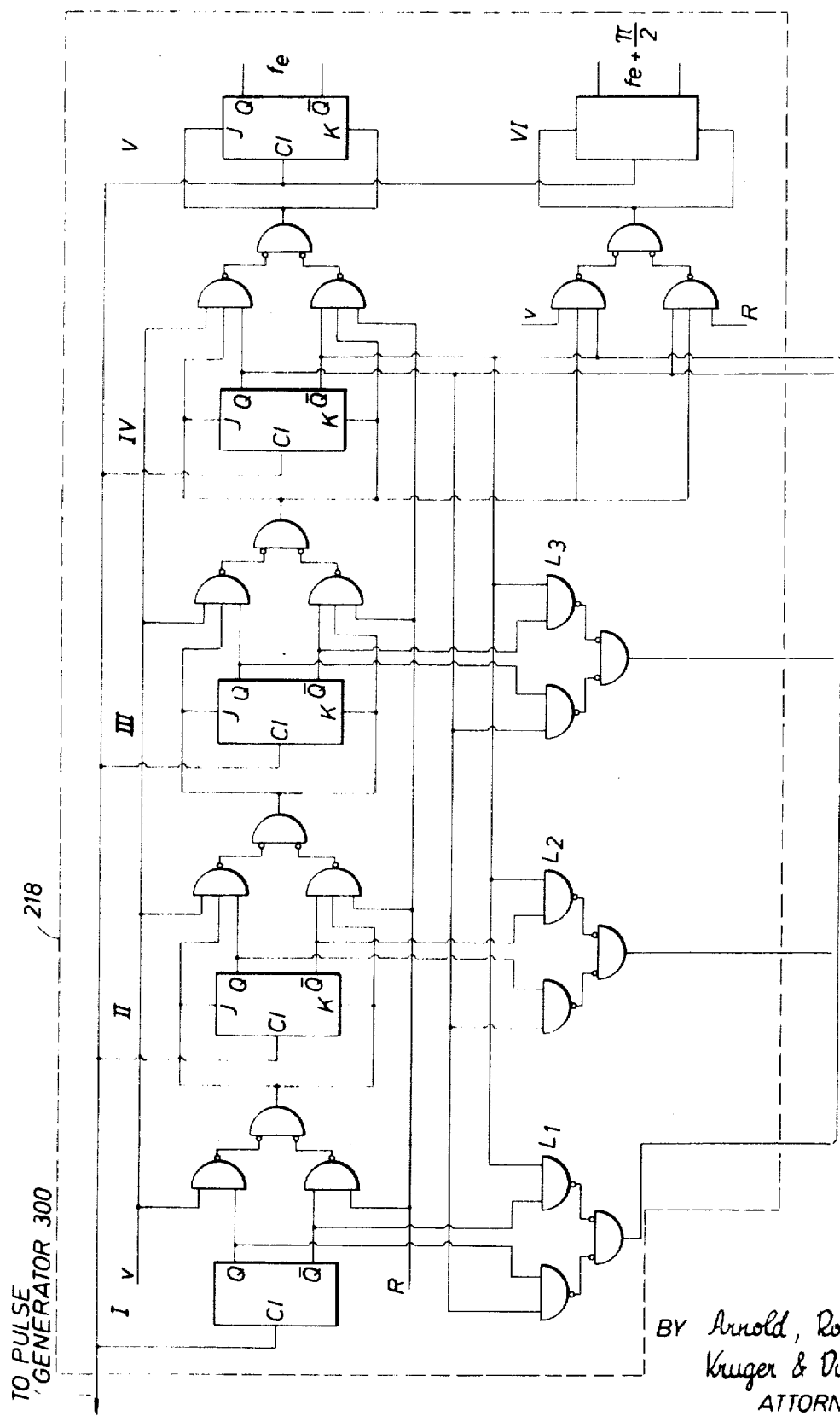
FIG. 6 is a functional diagram of a portion of the goniometer depicted in FIG. 5.

Referring now to FIG. 6, there may be seen a more detailed representation of an exemplary embodiment of the control counter chain 218, and depicting a binary bi-direction counter with five stages I-V, and with another stage VI which is phase-controlled oppositely with respect to stage V. Stages I-VI are all connected to receive the signal C1 provided by the pulse generator 300 for registering the trigger pulses. The outputs of stages V and VI are arranged for interconnection with signals $f_r$ and $f_r + \pi/2$ provided respectively by the inverters 202 and 230.

Referring now to FIG. 8, there may be seen a schedule showing the timing pulse sequence measured at six Q-outputs for 32 possible clocks. This is a normal binary code wherein only the Q-inputs of stages V and VI (when Q VI is compared to Q V) has operating times being shifted by eight clocks.

FIG. 8 further depicts the values which are to be shifted to obtain triangular amplitude functions for the outputs of the digital attenuators 214 and 216 respectively. Further, the values of the resistances to be switched are also staged binarily, and, as may be seen in FIG. 7, each attenuator contains four switch stages providing standardized current values of 1, 2, 4 and 1. If all switches in one of the attenuator circuits 214 and 216 are closed, the maximum value forwarded will be 8. Thus, the sum of the switched amplitude stages is represented in the summations $\Sigma 1$ and $\Sigma 2$, and the triangular function will proceed stepwise from 0 to 8, and backwards.

As further illustrated by FIGS. 6 and 7, polarity is determined by polarity reversal of the input voltages $f_r$ and $f_r + \pi/2$ into the attenuators 214 and 216, respectively. Since polarity change always occurs when the attenuators go to zero, there will be no transients at their outputs. It will be apparent that the sequence of the first three stages will deviate from the binary counting sequence of the counter 218. Accordingly, the logical combinations of AND and OR gates depicted in FIG. 6 have been included in the first three control stages I – III to change the code.

As may be seen in FIG. 7, each of the two digital attenuators 214 and 216 are provided with four input load resistances having the values R, R/2, R/4, and R, respectively, and these resistances may each further be seen to be bridged by a balancing capacitor C for exact frequency compensation. A constant AC voltage of suitable magnitude (for example, 10 Vss) is preferably supplied to the attenuators 214 and 216 by way of the capacitor 220 and limiting amplifier 224 depicted in FIG. 5.

It is desirable to maintain clear voltage control, in the attenuators 214 and 216, as well as to avoid reaching the breakdown levels of the diodes depicted in FIG. 7. This may be achieved by providing that the limiting amplifier 224 shall have a low impedance output, and is more particularly provided by means of the large integrating capacitor 220 and by the fact that the amplifier 224 is connected with the resistor 222 to form an operating amplifier.

As may be seen in FIG. 7, each stage of each of the two digital attenuators 214 and 216 are preferably provided with a pair of complementing transistors $T_1$ and $T_2$, which are interconnected ahead of the diodes, and both transistors will either be conducting or non-conducting. If both transistors in a stage are blocked, the AC signal which would otherwise be conducted therethrough will be routed to the output of the circuit by means of the respective resistances R and diodes D interconnected therewith. On the other hand, if both transistors are opened, the flowing current will be routed to ground by way of the resistance R.

Complementary transistors $T_1$ and $T_2$ have been provided in each stage since half waves of both positive and negative polarity will occur. The diodes prevent reactions occurring on other interconnected resistances in the circuit, if the output voltage remains below the flowing or breakdown voltage of the diodes.

Referring again to FIG. 4, it should be noted that clock and bi-direction control pulses of the goniometer will go parallel into a 16-bit bi-direction counter 116. This counter may be updated by being manually actuated when the surveying aircraft is directly overhead of a predetermined location. Thus, the counter 116 will yield the initial information required for a computer, and for recording geophysical data on punch cards or the like.

Although any suitable recording equipment may be used in the apparatus depicted in FIG. 4, the counter 116 is preferably connected through an intermediate storage 118 to a suitable meter 120 which indicates position in 5-digit octal form. Thus, only 15 bits will be indicated, and the peak value bit will be omitted. The storage 118 permits the indication to be arbitrarily stopped without influencing the meter 120, and this is useful for permitting control of the position indicated on the meter 120 at the instant it is updated. Also, when the aircraft is passing immediately over a fix point, the indication can be stopped in the moment the fix point is immediately beneath the aircraft without influencing the computer and recording output signal.

What is claimed is:

1. A radio navigation system for determining the location of a mobile station, said system comprising
    a first transmitter station disposed at a first location for generating a first preselected frequency,
    a second transmitter station disposed at a second different location for generating a second preselected frequency in coherent relationship with said first frequency,
    said first and second preselected frequencies both occupying a single frequency channel and both being sums of coherent related frequencies;
    a mobile receiver station for simultaneously receiving said first and second frequencies and including
    frequency means for generating a third preselected frequency in coherent relationship with said first and second frequencies, and comparison means for selecting and comparing one of said first and second frequencies with said third frequency.

2. The system described in claim 1, further comprising
a first frequency standard interconnected with said first transmitter station,
a second frequency standard interconnected with said second transmitter station and synchronized with said first frequency standard, and
a third frequency standard interconnected with said receiver station and synchronized with said first and second transmitter stations.

3. The system described in claim 2, wherein said first frequency is a carrier wave for the output of said first frequency standard,
wherein said second frequency is a carrier wave for the output of said second frequency standard, and
wherein said first and second frequency standards generate synchronized and equal output frequencies.

4. The system described in claim 3, wherein said receiver includes
first channel means for receiving said first frequency and suppressing said second frequency, and
second channel means for receiving said second frequency and suppressing said first frequency.

5. The system described in claim 4, wherein said third frequency standard generates an output frequency which is synchronized with and equal to said output frequencies of said first and second frequency standards.

6. The system described in claim 5, wherein said first and second transmitter stations each include
a divider chain having a plurality of stages responsive to the output frequency of the frequency standard associated therewith and each delivering a fraction of said output frequency within a time period within which the other of said stages do not deliver any of said output frequency, and
combining means responsive to said divider chain for combining delivered fractions of said output frequency into a frequency being the sum of coherent related frequencies.

7. The system described in claim 6, wherein said receiver station includes
a divider chain having a plurality of stages responsive to the output frequency of said third frequency standard and each delivering a fraction of said output frequency within a time period within which the other of said stages do not deliver any of said output frequency, and
combining means responsive to said divider chain in said receiver station for combining delivered fractions of said output frequency of said third frequency standard into a sum of coherent related frequencies for phase comparison with said sum of coherent related frequencies from said first and second transmitter stations.

8. The receiver station described in claim 7, wherein said combining means further generates a fixed frequency difference relative to said selected one of said sum of coherent related frequencies generated by said first and second transmitter stations.

9. The system described in claim 8, wherein the respective initial frequency of the preceeding stage in each of said divider chains is divided by a factor of 2 in each of the subsequent stages therein.

10. The system described in claim 9, including multiplying means interconnected between the frequency standards and the divider chain in each of said stations.

11. The system described in claim 10, including divider means responsive to the sum of coherent related frequencies from the divider chain in each of said stations.

12. A radio navigation system for determining the location of a mobile station, said system comprising
a mobile receiving station, and
a pair of transmitter stations at different fixed locations and each including
a frequency standard,
a digital dynamic multiplier responsive to the output of said frequency standard,
a voltage controlled oscillator, and
a phase comparator interconnected between said oscillator and said digital dynamic multiplier.

13. The system described in claim 12, wherein the frequency standard in one transmitter station is identical to the frequency standard in the other transmitter station.

14. The system described in claim 13, wherein each of said transmitter stations further includes
an antenna circuit responsive to the output of said oscillator, and
integrating means responsive to said phase comparator for regulating said oscillator.

15. The system described in claim 14, wherein each of said transmitter stations further includes
a frequency divider responsive to the output of said oscillator for deriving a first frequency and a second frequency equal to but 180° out of phase with said first frequency,
a first pulse generator for generating a first pulse train functionally related to said first frequency,
a second pulse generator for generating a second pulse train functionally related to said second frequency, and
feeder circuit for feeding said first and second pulse trains to said antenna circuit.

16. The system described in claim 15, wherein said integrating means includes an operational amplifier.

17. The system described in claim 16, wherein said digital dynamic multiplier includes
a plurality of flip flop circuits arranged as a chain,
an OR gate, and
a chain of switches each interconnected between a separate input to said OR gate and a different one of said flip flop circuits.

18. The system described in claim 17, wherein each of said transmitter stations further includes
a first frequency divider interconnected between said OR gate and said phase comparator, and
a second frequency divider interconnected between said oscillator and said phase comparator, and
wherein said first and second frequency dividers have equal division factors.

19. The system described in claim 18, wherein said phase comparator is logically interconnected with the chain of flip flops in said digital dynamic multiplier and includes a following dynamic analog converter delivering a direct voltage functionally dependent on phase difference to said oscillator.

20. The system described in claim 19, wherein said feeder circuit includes a push-pull circuit responsive to the outputs of said first and second pulse generators for driving said antenna circuit.

21. A radio navigation system for determining the location of a mobile station, said system comprising
   a pair of transmitter stations at different fixed locations and each including
      a frequency standard identical in output to the frequency standard in the other transmitter station, and
      synthesizing means responsive to the output of the instant frequency standard for providing a preselected synthesized output frequency; and
   a mobile receiving station including
      a frequency standard identical in output to the frequency standards in said transmitter stations,
      selection and suppression means for selecting the output frequency from one of said transmitter stations and for suppressing the output frequency from the other of said transmitter stations, said selection and suppression means including antenna means for receiving signals from said transmitter stations, a first channel means tuned to the output frequency from one of said transmitter stations, a second channel means tuned to the output frequency from the other of said transmitter stations, a crystal filter means for selecting one of said channel means and having a passage maximum adjusted to the output frequency associated with said one of said channel means and an attenuation maximum adjusted to the output frequency associated with the other of said channel means, and
      comparison means for comparing a function of said selected output frequency with a function of the output of said frequency standard in said receiving station.

22. The receiver station described in claim 21, wherein said crystal filter means is a double crystal filter having an amplifier stage therebetween.

23. The receiver station described in claim 22, wherein each of said channel means includes
   a digital dynamic multiplier responsive to said frequency standard in said receiver station,
   a voltage controlled oscillator responsive to said digital dynamic multiplier, and
   a mixer stage responsive to said oscillator and to said double crystal filter for hetrodyning the output of said filter with the output of said oscillator.

24. The receiver station described in claim 23, wherein said comparison means includes
   a phase controlled oscillator responsive to the output of said mixer stage, and
   a phase comparator responsive to said phase controlled oscillator and said frequency standard in said receiver station.

25. The receiver station described in claim 24, wherein said phase comparator includes a goniometer and display means.

26. The receiver station described in claim 25, wherein said goniometer includes
   a square wave generator,
   a phase comparator circuit responsive to said square wave generator and to said frequency standard in said receiver station, and
   a dynamic analog converter responsive to said phase comparator circuit for providing a phase dependent direct voltage.

27. The receiver station described in claim 26, wherein said goniometer further includes
   a pulse generator responsive to said dynamic analog converter for producing a trigger pulse, and
   a control counter chain responsive to said trigger pulse and said phase dependent output voltage for providing a bi-direction information signal to said display means.

28. The receiver station described in claim 27, wherein said square wave generator includes
   a first inverter responsive to said control counter chain for providing pulses of a first polarity,
   a second inverter responsive to said control counter chain for providing pulses of a second polarity, and
   delay means interconnected with said second inverter to shift the phase of said pulses of said second polarity by a factor of $\pi/2$ relative to said pulses of a first polarity.

29. The receiver station described in claim 28, wherein said square wave generator further includes
   a first voltage limiting amplifier responsive to said first inverter,
   a second voltage limiting amplifier responsive to said second inverter,
   a first digital attenuator responsive to said first voltage limiting amplifier and to said control counter chain, and
   a second digital attenuator responsive to said second voltage limiting amplifier and to said control counter chain.

30. The receiver station described in claim 29, wherein said square wave generator further includes
   an integrator means responsive to said digital attenuators, and
   a differential comparator interconnected between said integrator means and said phase comparator circuit.

31. The receiver station described in claim 30, wherein said integrator means comprises
   an integrating capacitor coupled to the outputs of said digital attenuators, and
   an operational amplifier interconnected between said capacitor and said difference comparator.

32. The receiver station described in claim 31, wherein said goniometer further includes
   an amplifier connected between the output of said dynamic analog converter and said pulse generator, and
   limiting means connected between said amplifier and said pulse generator.

33. The receiver station described in claim 32, wherein said goniometer further includes
   a wave rectifier connected between said limiting means and said pulse generator comprising two operational amplifiers.

34. A transmitter station for a radio navigation system having a frequency standard in the receiving station, said transmitter station comprising
   a frequency standard synchronized with and identical in output to the frequency standard in said receiving station,
   a frequency multiplier responsive to said synchronized frequency standard,
   a frequency synthesizer responsive to the output of said frequency multiplier,
   a frequency divider responsive to the output of said frequency synthesizer for providing a first output pulse train and a second output pulse train shifted 180° in phase relative to said first output pulse train, and antenna means responsive to said pulse trains from said frequency divider for providing an output signal which is a function of said output of said frequency standards.

35. The transmitter station described in claim 34, further including a first monostable multivibrator interconnected with said frequency divider to generate said first output pulse train, a second monostable multivibrator interconnected with said frequency divider to generate said second output pulse train, a push-pull circuit responsive to said first and second output pulse trains, a transmitting antenna, and a tank circuit interconnected between said antenna and said push-pull circuit.

36. The transmitter station described in claim 35, wherein said frequency synthesizer includes a dynamic multiplier responsive to said frequency multiplier, a voltage controlled oscillator having its output connected to said frequency divider, and a phase comparator interconnected between said dynamic multiplier and said oscillator.

37. The transmitter station described in claim 36, wherein said frequency synthesizer further includes a first chain of flip flops interconnected between said dynamic multiplier and said phase comparator, a second equal chain of flip flops interconnected between said oscillator and said phase comparator, and an operational amplifier responsive to said phase comparator and interconnected to drive said oscillator.

38. The frequency synthesizer described in claim 37, wherein said dynamic multiplier includes a plurality of flip flop circuits arranged to be each triggered by a preceeding flip flop circuit and the first to be triggered by said frequency multiplier, a plurality of differentiating circuits each connected to the output of a respective one of said plurality of flip flop circuits, an OR gate having its output connected to the input of said first chain of flip flops, and switching means for coupling the outputs of selected ones of said plurality of flip flop circuits to the inputs of said OR gate.

39. A receiver station for a radio navigation system having two transmitter stations and having a synchronized frequency standard in each transmitter station with an output identical to the output of the other frequency standard, said receiver station comprising a third frequency standard synchronized with and having an output identical to the outputs of the frequency standards in said transmitter stations, a dynamic multiplier responsive to said output of said third frequency standard, an oscillator responsive to said dynamic multiplier, a mixer stage responsive to said selection and suppression means and to said oscillator for providing an output signal functionally related to said selected frequency, antenna means for receiving a frequency from each of said transmitter stations, selection and suppression means for selecting one of said received frequencies and suppressing the other of said received frequencies, and comparison means responsive to said selected frequency and said synchronized output of said third frequency standard for deriving an indication of the travel time of said selected frequency from the transmitter station generating said selected frequency to said receiver station.

40. The receiver station described in claim 39, further including another oscillator responsive to said output signal from said mixer stage, and a phase comparator responsive to said another oscillator and said output from said third frequency standard.

41. The receiver station described in claim 40, further including a goniometer responsive to said phase comparator.

* * * * *